Figure 1:
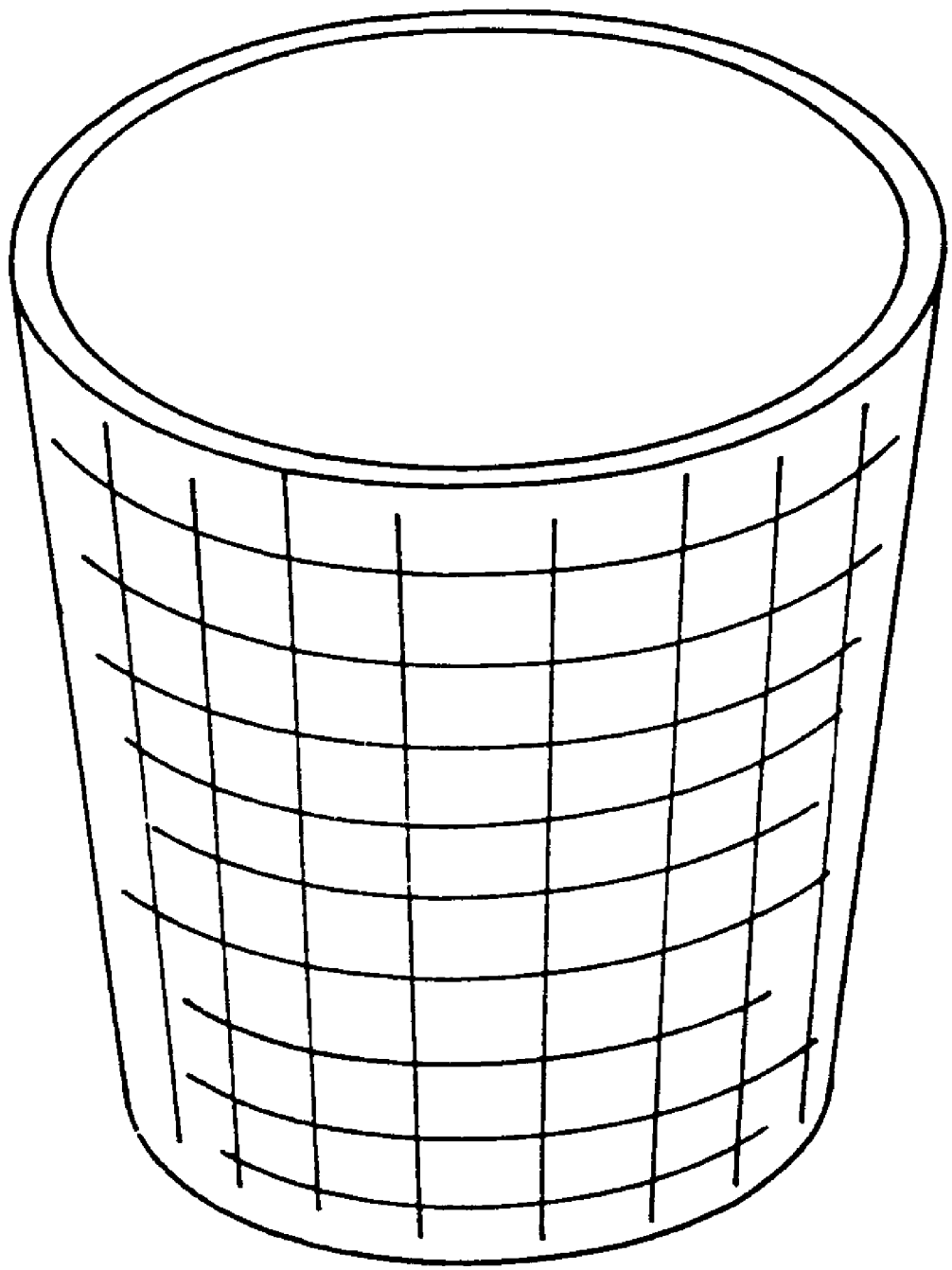

United States Patent
Petrini et al.

[11] Patent Number: 6,068,866
[45] Date of Patent: May 30, 2000

[54] CUP FOR DRINKS MADE OF EDIBLE TWICE-BAKED PASTRY

[75] Inventors: Francesca Petrini, Monte san Vito; Leonida Petrini; Cristiano Petrini, both of Chiaravalle, all of Italy

[73] Assignee: Livecraft Limited, United Kingdom

[21] Appl. No.: 09/194,454

[22] PCT Filed: May 27, 1997

[86] PCT No.: PCT/IT97/00119

§ 371 Date: Nov. 19, 1998

§ 102(e) Date: Nov. 19, 1998

[87] PCT Pub. No.: WO97/45028

PCT Pub. Date: Dec. 4, 1997

[30] Foreign Application Priority Data

May 31, 1996 [IT] Italy ................................ AN96A0020

[51] Int. Cl.[7] .................................................. A21D 15/08
[52] U.S. Cl. ............................ 426/94; 426/55; 426/138; 426/139
[58] Field of Search ..................... 426/138, 139, 426/94, 289, 290, 291, 292, 293, 294, 549, 550, 95

[56] References Cited

U.S. PATENT DOCUMENTS

| | | | |
|---|---|---|---|
| 2,167,353 | 7/1939 | Frediani | 426/95 |
| 4,076,846 | 2/1978 | Nakatsuk et al. | 426/62 |
| 4,216,240 | 8/1980 | Shirai et al. | 426/516 |
| 4,603,051 | 7/1986 | Rubenstein et al. | 426/138 |
| 4,927,655 | 5/1990 | Ito | 426/549 |
| 5,304,386 | 4/1994 | Dugas et al. | 426/94 |
| 5,354,621 | 10/1994 | Liebermann | 428/532 |
| 5,389,322 | 2/1995 | Kim et al. | 264/112 |

FOREIGN PATENT DOCUMENTS

| | | | |
|---|---|---|---|
| 5-254571 | 5/1993 | Japan | 426/138 |
| 96/20604 | 7/1996 | WIPO | 426/138 |

*Primary Examiner*—Milton Cano
*Assistant Examiner*—Hao Mai
*Attorney, Agent, or Firm*—Leonard Bloom

[57] ABSTRACT

An edible cup made of twice-baked pastry having on impermeable layer consisting essentially of sugar, water, starch and gum capable of containing hot and cold drinks without loosing it structural hardness and without any liquid leaking out.

6 Claims, 1 Drawing Sheet

CUP FOR DRINKS MADE OF EDIBLE TWICE-BAKED PASTRY

This patent application concerns a cup for hot or cold drinks, made of an edible twice-baked pastry.

The article manufactured according to the invention represents a revolutionary innovation in the serving of drinks in the public catering sector.

As is well known, coffee and other hot drinks—such as tea, chocolate and the likes—are currently served to the public in ceramic cups.

Yet the use of such crockery is inevitably associated with various inconveniences of no small consequence.

In this respect, and above all, the expenses shouldered by the owner of a concern in order to acquire a sufficient number of such ceramic cups should be taken into account.

Secondly, it is important to consider the necessity to wash each cup immediately after use, such operation requiring considerable time and effort on the part of personnel, not to mention the cost inherent to the purchase and operation of a dishwasher, a now common and widespread appliance.

It must furthermore be noted that the cups used in public catering are increasingly suspected of being vehicles for the oral transmission of infectious diseases; it must be said that tests actually show that most viruses responsible for serious, and sometimes mortal, diseases are resistant even to the temperatures such cups are subjected to in normal washing cycles inside a common dishwasher.

To be honest, most of the above problems may be considered as being solved by the use of common disposable paper cups; yet the use of the latter type of containers is undoubtedly offset by the fact that it results in an enormous output of solid waste, which is moreover highly polluting as the paper used for such cups is plasticised.

The article manufactured according to the invention was conceived in consideration of the above mentioned problems.

It consists of a disposable container for hot drinks made of a pastry which is twice baked and—as such—bears the unique and innovative feature of being edible once the liquid contained in it has been drunk.

Such container may be shaped as a cup with its relative handle, but there is no reason why it may not be manufactured without a handle, as a simple beaker.

Vessels made with edible pastry are in fact already known.

Patent DE-A-4218392 describes a procedure for realising a cup for eating and drinking, which once used, can be eaten.

This patent clearly states that in order to make the edible pastry stable and impermeable, a certain quantity of macromolecular former such as xantorrea, is added which makes the pastry impermeable even to hot drinks.

In this procedure, the pastry to which a macromolecular former has been added, is pressed in the mould and baked at the same time.

U.S. Pat. No. 4,927,655 describes a procedure for moulding an edible vessel made of a pastry used in ice cream wafers, according to which the pastry is made by mixing sugar with wheat flour and adding oil, fat, eggs and water.

The pastry made in this way is placed and baked in a special mould in order to obtain an edible vessel of the shape and dimensions required.

This patent provides no teaching as to how to make the edible vessel impermeable and capable of keeping its shape and compactness when in contact with hot liquid such as coffee or tea, for a certain length of time.

Patent FR-A-2437996 describes an edible vessel for packaging which consists substantially of a vessel shaped biscuit made of a common edible pastry to which special substances are added to ensure a long shelf life.

This biscuit s coated with a chocolate and sugar icing layer which stops the biscuit from absorbing cold and moisture.

Therefore this coating does not make the biscuit impermeable, on the other hand it is clearly stated in this patent that said vessel shaped biscuit must not be used to hold drinks but only for making cakes, ice cream cakes etc.

The purpose of this invention is to realise a mono-use edible vessel which can hold hot drinks, even for a considerable length of time, without loosing its stability.

The vessel in question is made of a pastry like that used for making ice cream wafers; said pastry must be moulded and baked in the same was as ice cream wafers.

In view of the foregoing, it is not retained necessary to provide a detailed description of the ingredients and the moulding process of the edible cup according to the invention in that, as previously mentioned, the same is made with a pastry and process identical to those used for making ice cream wafers whose ingredients and moulding and baking processes are well known.

The feature of the cup according to the invention is that its inner walls are crated with a water proofing layer made with a sugar based substance of the type used in sugar coated almonds.

In this regard, it should be noted that it is well known that the sugar coating of almonds is impermeable and melts, only after a considerable length of time, when in contact with liquids, even if these are hot.

The particular resistance to liquids of this sugar coating is due to the fact that it is not simply sugar icing (of the type used to coat the vessel described in patent FR-A-2437996), but a mixture of sugar and starches, which make the coating particularly hard and impermeable.

For major clarity the description of the item continues with reference to the enclosed drawing which is intended for the purpose of illustration and not in a limiting sense, in which FIG. 1 shows an axonometric view of the edible container according to the invention, in its handle-less version.

Even if it is not retained to be necessary to describe how this impermeable coating of the cup according to the invention is made, in that the same is made, as mentioned above, with the same ingredients (in themselves known) and with the same procedure (in itself known) used for making the sugar based layer of sugar coated almonds, it is pointed out that layer coating the cup cons sts of a mixture of:

sugar or its surrogates,
water
starches, such as corn starches or albumin,
Arabian gum.

The starches have a hardening and impermeabilizing action in order to obtain a compact, hard and impermeable layer; the Arabian gum on the other hand acts as an additional waterproofing agent.

This preliminary description already conveys the numerous advantages inherent to the article according to the invention, taking into account the fact that it is designed to be eaten by the user after consumption of the drink.

Owners of public catering concerns who adopt such edible cups would no longer have to bear the cost of purchasing ceramic cups, nor the expense inherent to washing them.

Moreover, considering the fact that such cups are strictly disposable, it can easily be understood that their regular use in a catering concern would safeguard customers against oral transmission of contagious diseases.

Compared to paper cups, on the other hand, the edible cups in question are preferable in that they do not generate any accumulation of solid waste.

In addition—beyond all practical, sanitary and economic concerns—it must be stressed that the cup in question is further appreciated and relished by the user, who—having enjoyed the drink contained in it—may then go on to eat the cup itself, tasting its delicious wafer.

In such perspective, it is easy to see that to better satisfy the more demanding consumer's palate, the pastry used in making such cup may be of a neutral flavour, or of any other flavour as desired, for instance vanilla, cream, coffee, or honey, etc.

Thus the same customer may choose, in turn, the favourite flavoured cup in relation to the drink to be served in it.

Likewise, the pastry may contain added vitamins, making it particularly suitable for children.

What is claimed is:

1. An edible cup for drinks comprising:

a pastry formed in the shape of a cup having inner walls, a coating disposed on the inner walls of the cup, the coating consisting essentially of sugar, water, starch and gum such that the coating forms a compact, hard and impermeable layer which resists dissolving and melting when hot liquids are contained in the cup, and wherein the cup and the coating may be eaten after the liquid is consumed.

2. The edible cup of claim 1, wherein the starch is cornstarch.

3. The edible cup of claim 1, wherein the starch is albumin.

4. The edible cup of claim 1, wherein the gum is Arabian gum.

5. The edible cup of claim 1, wherein a flavor is added to the pastry.

6. The edible cup of claim 1, wherein vitamins are added to the pastry.

* * * * *